United States Patent
Choi et al.

(10) Patent No.: US 12,470,278 B2
(45) Date of Patent: Nov. 11, 2025

(54) METHOD AND DEVICE FOR SIDELINK GROUPCAST COMMUNICATION

(71) Applicants: Hyundai Motor Company, Seoul (KR); Kia Corporation, Seoul (KR)

(72) Inventors: Su Han Choi, Gyeonggi-do (KR); Gene Back Hahn, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 50 days.

(21) Appl. No.: 18/672,467

(22) Filed: May 23, 2024

(65) Prior Publication Data

US 2024/0323932 A1 Sep. 26, 2024

Related U.S. Application Data

(63) Continuation of application No. 17/298,797, filed as application No. PCT/KR2020/001353 on Jan. 29, 2020, now Pat. No. 11,997,654.

(Continued)

(30) Foreign Application Priority Data

Jan. 2, 2020 (KR) .................. 10-2020-0000260

(51) Int. Cl.
*H04B 7/06* (2006.01)
*H04L 1/1812* (2023.01)
(Continued)

(52) U.S. Cl.
CPC ........ *H04B 7/06954* (2023.05); *H04B 7/0617* (2013.01); *H04L 1/1812* (2013.01); *H04W 72/044* (2013.01); *H04W 92/18* (2013.01)

(58) Field of Classification Search
CPC . H04B 7/06954; H04B 7/0617; H04L 1/1812; H04W 72/044

See application file for complete search history.

(56) References Cited

U.S. PATENT DOCUMENTS

2017/0207845 A1* 7/2017 Moon .................. H04B 7/088
2017/0366236 A1 12/2017 Ryoo et al.
(Continued)

FOREIGN PATENT DOCUMENTS

EP 4583449 A2 * 7/2025 ............ H04W 72/30
KR 10-2018-0135480 A 12/2018
(Continued)

OTHER PUBLICATIONS

R1-1813014, "Discussion on physical layer structures of NR sidelink", 3GPP TSG RAN WG1 Meeting #95, Spokane, US, Nov. 12-16, 2018, Agenda Item 7.2.4.1.1, 6 pages.
(Continued)

*Primary Examiner* — Kenny S Lin
(74) *Attorney, Agent, or Firm* — Fox Rothschild LLP

(57) ABSTRACT

Disclosed are a method and a device for sidelink groupcast communication. A method for operating a transmitting terminal comprises the steps of: transmitting an SS/PBCH block for sidelink communication in all directions by using a beam sweeping method; receiving, from a plurality of receiving terminals, first feedback information about the SS/PBCH block; and transmitting a sidelink channel in a specific direction by using beams of the transmitting terminal that are determined on the basis of the first feedback information. Therefore, communication system performance can be improved.

20 Claims, 8 Drawing Sheets

Related U.S. Application Data

(60) Provisional application No. 62/800,052, filed on Feb. 1, 2019.

(51) Int. Cl.
*H04W 72/044* (2023.01)
*H04W 92/18* (2009.01)

(56) References Cited

U.S. PATENT DOCUMENTS

| | | |
|---|---|---|
| 2018/0083719 A1 | 3/2018 | Kim et al. |
| 2018/0287866 A1 | 10/2018 | Yoon |
| 2019/0028244 A1* | 1/2019 | Si ............................ H04W 72/23 |
| 2019/0132170 A1* | 5/2019 | Si ........................ H04W 56/001 |
| 2019/0387412 A1* | 12/2019 | Kim ...................... H04B 7/0695 |
| 2020/0037301 A1 | 1/2020 | Park |
| 2020/0045664 A1 | 2/2020 | Choi et al. |
| 2020/0100222 A1 | 3/2020 | Chakraborty et al. |
| 2020/0106566 A1 | 4/2020 | Yeo et al. |
| 2021/0219268 A1 | 7/2021 | Li et al. |
| 2021/0321343 A1* | 10/2021 | Ryu .................. H04W 56/0025 |
| 2021/0392592 A1 | 12/2021 | Ko et al. |
| 2022/0014338 A1* | 1/2022 | Yoshioka ............... H04W 8/005 |
| 2022/0015067 A1* | 1/2022 | Li ..................... H04W 72/0446 |
| 2022/0039080 A1 | 2/2022 | Khoryaev et al. |
| 2022/0046631 A1 | 2/2022 | Li et al. |
| 2022/0086602 A1 | 3/2022 | Ashraf et al. |
| 2022/0286876 A1 | 9/2022 | Van Phan et al. |
| 2022/0346046 A1 | 10/2022 | Huang et al. |

FOREIGN PATENT DOCUMENTS

| | | |
|---|---|---|
| WO | 2017/176022 A1 | 10/2017 |
| WO | 2017/184865 A1 | 10/2017 |
| WO | 2018/129300 A1 | 7/2018 |

OTHER PUBLICATIONS

R1-1900862, "Beamforming for V2X sidelink for FR1 and FR2", 3GPP TSG RAN WG1 Ad-Hoc Meeting 1901, Taipei, Jan. 21-25, 2019, Agenda Item 7.2.4.1.5, 5 pages.
"Beamforming for V2X sidelink for FR1 and FR2", 3GPP TSG RAN WG1 Ad-Hoc Meeting 1901, Taipei, Jan. 21-25, 2019, R1-1900862, 5 pages.
GPP TSG RAN WG1 Ad-Hoc Meeting 1901; R1-1900301; Taipei, Jan. 21-25, 2019; Source:OPPO; Title: Physical layer procedure for NR-V2X; Agenda Item: 7.2.4.1.2.
3GPP TSG RAN WG1 Ad-Hoc Meeting 1901 ; R1-1900776; Taipei, Jan. 21-25, 2019 Source: ZTE, Sanechips; Title: Discussion on synchronization mechanism in NR VZX; Agenda item: 7.2.4.1.3.
3GPP TSG RAN WG1 Ad-Hoc Meeting 1901; R1-1900862; Taipei, Jan. 21-25, 2019; Agenda Item:7_2_4_ 1.5; Source: Huawei, HiSilicon; Title: Beamforming for V2X sidelink for FR1 and FR2.

* cited by examiner

METHOD AND DEVICE FOR SIDELINK GROUPCAST COMMUNICATION

CROSS-REFERENCE TO RELATED APPLICATION

This application is a continuation of U.S. patent application Ser. No. 17/298,797, filed on Jun. 1, 2021, now U.S. Pat. No. 11,997,654 with an issue date of May 28, 2024, which is a National Phase of International Patent Application No. PCT/KR2020/001353, filed Jan. 29, 2020, which claims the benefit of U.S. Provisional Application No. 62/800,052, filed Feb. 1, 2019, and Korean Patent Application No. 10-2020-0000260, filed Jan. 2, 2020, the entire contents of which are incorporated herein by reference.

TECHNICAL FIELD

The present disclosure relates generally to sidelink communication techniques, and more specifically, to techniques for beamforming-based sidelink communication to support groupcast services.

BACKGROUND

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication system, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

Meanwhile, sidelink communication may be performed using a high frequency band (e.g., a millimeter wave band). In this case, the sidelink communication may be performed in a beam sweeping scheme. Accordingly, a transmitting terminal may transmit sidelink signals and/or channels in omni-direction by rotating a beam. The sidelink communication may support broadcast services, multicast services, groupcast services, and unicast services.

When the sidelink communication supports the groupcast service, locations of receiving terminals participating in the groupcast service may be limited to specific areas. Even in this case, if the transmitting terminal transmits sidelink signals and/or channels in the omni-direction according to the beam sweeping scheme, a transmission delay may occur due to unnecessary transmission procedures (e.g., beam transmission to an area where the receiving terminal does not exist), and power loss may also increase. In addition, the unnecessary transmission procedures may cause interferences to other communication nodes.

SUMMARY

Accordingly, exemplary embodiments of the present disclosure provide a method and an apparatus for sidelink communication based on beamforming for supporting groupcast services.

According to exemplary embodiments of the present disclosure, an operation method of a transmitting terminal in a communication system may include transmitting a synchronization signal/physical broadcast channel (SS/PBCH) block for sidelink communication in an omni-direction by using a beam sweeping scheme; receiving first feedback information for the SS/PBCH block from a plurality of receiving terminals; and transmitting a sidelink channel in a specific direction by using beams of the transmitting terminal, which are determined based on the first feedback information, wherein a transmission area corresponding to the specific direction is narrower than a transmission area corresponding to the omni-direction.

The SS/PBCH block may be transmitted within a beam sweeping interval configured by a base station to which the transmitting terminal is connected, and the beam sweeping interval may be configured within a bandwidth part (BWP) for the sidelink communication.

The first feedback information may include a beam index of the transmitting terminal selected based on a beam quality measured based on the SS/PBCH block. A transmission interval may be configured based on the first feedback information, and the sidelink channel may be transmitted to the plurality of receiving terminals in the beam sweeping scheme within the transmission interval.

The operation method may further include classifying the plurality of receiving terminals into one or more groups based on locations of the plurality of receiving terminals identified based on the first feedback information, wherein the sidelink channel is transmitted in the beam sweeping scheme within a transmission interval for each of the one or more groups.

The operation method may further include transmitting configuration information of the transmission interval to the plurality of receiving terminals before transmitting the sidelink channel, wherein the configuration information of the transmission interval includes information indicating a start point of the transmission interval, information indicating a length of the transmission interval, information indicating a bandwidth of the transmission interval, information indicating a periodicity of the transmission interval, and identifiers of one or more receiving terminals performing the sidelink communication within the transmission interval among the plurality of receiving terminals.

The operation method may further include receiving second feedback information for the sidelink channel from the plurality of receiving terminals; and determining whether to perform a beam update operation based on the second feedback information, wherein the second feedback information includes one or more of a hybrid automatic repeat request (HARQ) response and quality information for the sidelink channel.

The sidelink channel may include a physical sidelink control channel (PSCCH) and a physical sidelink shared channel (PSSCH), and the PSCCH may include scheduling information of the PSSCH and triggering information for a beam update operation.

Furthermore, in accordance with exemplary embodiments of the present disclosure, an operation method of a receiving terminal in a communication system may include receiving a synchronization signal/physical broadcast channel (SS/PBCH) block for sidelink communication from a transmitting terminal in a beam sweeping interval; selecting a beam index of the transmitting terminal based on quality information measured based on the SS/PBCH block; transmitting first feedback information including the beam index to the transmitting terminal; and receiving a sidelink channel from the transmitting terminal in a transmission interval configured based on the first feedback information, wherein the SS/PBCH block is transmitted in an omni-direction of the transmitting terminal within the beam sweeping interval, the sidelink channel is transmitted in a specific direction of the transmitting terminal within the transmission interval, and a transmission area corresponds to the specific direction is narrower than a transmission area corresponding to the omni-direction.

The SS/PBCH block may be received within the beam sweeping interval configured by a base station to which the receiving terminal is connected, and the beam sweeping interval may be configured within a bandwidth part (BWP) for the sidelink communication. The transmission interval may be configured for a plurality of receiving terminals including the receiving terminal, and the sidelink channel for each of the plurality of receiving terminals may be transmitted in the beam sweeping scheme within the transmission interval.

The operation method may further include receiving configuring information of the transmission interval from the transmitting terminal before receiving the sidelink channel, wherein configuration information of the transmission interval includes information indicating a start point of the transmission interval, information indicating a length of the transmission interval, information indicating a bandwidth of the transmission interval, and information indicating a periodicity of the transmission interval.

The operation method may further include transmitting second feedback information for the sidelink channel to the transmitting terminal, wherein the second feedback information includes one or more of a hybrid automatic repeat request (HARQ) response and quality information for the sidelink channel, and the transmitting terminal determines whether to perform a beam update operation based on the second feedback information. The sidelink channel may include a physical sidelink control channel (PSCCH) and a physical sidelink shared channel (PSSCH), and the PSCCH may include scheduling information of the PSSCH and triggering information for a beam update operation.

Furthermore, in accordance with exemplary embodiments of the present disclosure, a transmitting terminal performing sidelink communication may include a processor; and a memory storing at least one instruction executable by the processor, wherein when executed by the processor, the at least one instruction causes the processor to transmit a sidelink signal used for beam measurement in an omni-direction by using a beam sweeping scheme; receive first feedback information for the sidelink signal from a plurality of receiving terminals; and transmit a sidelink channel in a specific direction by using beams of the transmitting terminal, which are determined based on the first feedback information, wherein a transmission area corresponding to the specific direction is narrower than a transmission area corresponding to the omni-direction.

The sidelink signal may be transmitted within a beam sweeping interval configured by a base station to which the transmitting terminal is connected, and the beam sweeping interval may be configured within a bandwidth part (BWP) for the sidelink communication. A transmission interval may be configured based on the first feedback information, and the sidelink channel may be transmitted to the plurality of receiving terminals in the beam sweeping scheme within the transmission interval.

The at least one instruction may further cause the processor to classify the plurality of receiving terminals into one or more groups based on locations of the plurality of receiving terminals identified based on the first feedback information, wherein the sidelink channel is transmitted in the beam sweeping scheme within a transmission interval for each of the one or more groups.

The at least one instruction may further cause the processor to transmit configuration information of the transmission interval to the plurality of receiving terminals before transmitting the sidelink channel, wherein the configuration information of the transmission interval includes information indicating a start point of the transmission interval, information indicating a length of the transmission interval, information indicating a bandwidth of the transmission interval, information indicating a periodicity of the transmission interval, and identifiers of one or more receiving terminals performing the sidelink communication within the transmission interval among the plurality of receiving terminals.

The at least one instruction may further cause the processor to receive second feedback information for the sidelink channel from the plurality of receiving terminals; and determine whether to perform a beam update operation based on the second feedback information, wherein the second feedback information includes one or more of a hybrid automatic repeat request (HARQ) response and quality information for the sidelink channel.

According to the exemplary embodiments of the present disclosure, the transmitting terminal can transmit sidelink signals and/or channels using beam(s) associated with area(s) where the receiving terminals participating in the groupcast service are located. In other words, the transmitting terminal can transmit the beam(s) in a specific direction(s), not the omni-direction. Therefore, transmission delay in sidelink communication can be reduced, power consumption of the transmitting terminal can be reduced, and interference caused by the sidelink communication can be reduced. Thus, the performance of the communication system can be improved.

DETAILED DESCRIPTION

Figure 1:
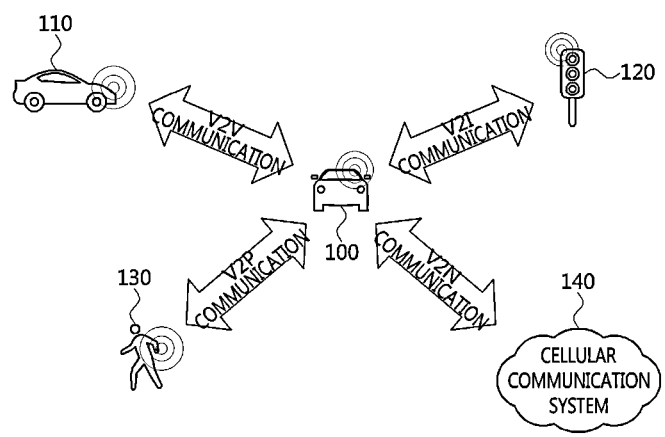
FIG. 1 is a conceptual diagram illustrating V2X communication scenarios.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." In particular, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various types of driving information such as velocity, heading, time, position, and the like may be exchanged between the vehicles 100 and 110 via the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located in the vehicle 100 or the communication node carried by the person 130 may generate an alarm indicating a danger by determining a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
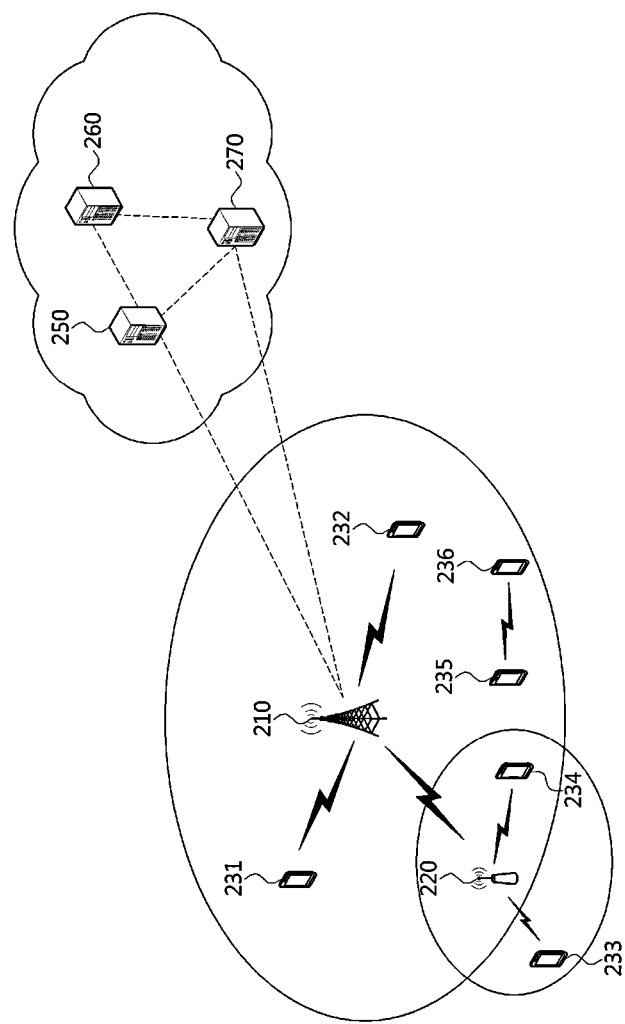
FIG. 2 is a conceptual diagram illustrating exemplary embodiments of a cellular communication system.

FIG. 2 is a conceptual diagram illustrating exemplary embodiments of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported via the V2X network slice configured in the core network.

The communication nodes (e.g., base station, relay, UE, S-GW, P-GW, MME, UPF, SMF, AMF, etc.) comprising the cellular communication system may perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
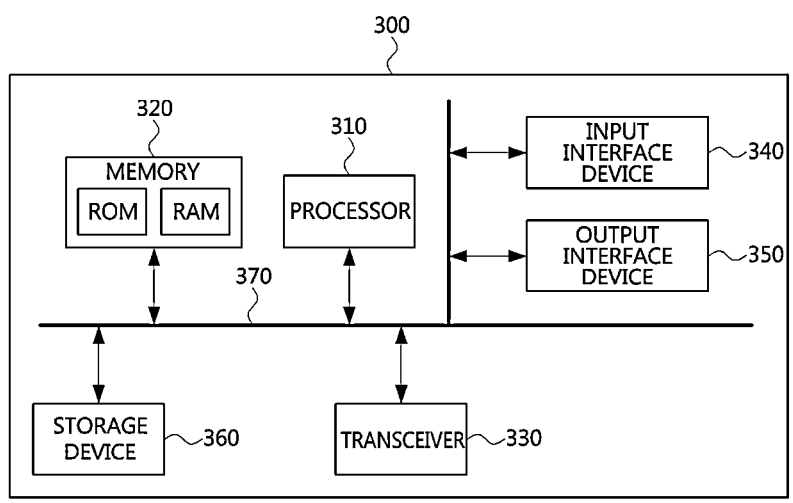
FIG. 3 is a conceptual diagram illustrating exemplary embodiments of a communication node constituting a cellular communication system.

FIG. 3 is a conceptual diagram illustrating exemplary embodiments of a communication node constituting a cellular communication system.

As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. In other words, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (COMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

In particular, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
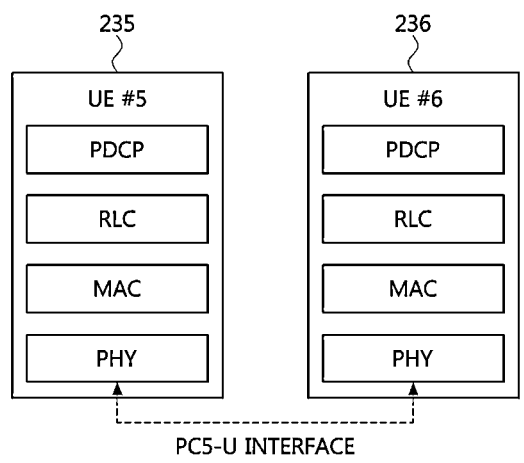
FIG. 4 is a block diagram illustrating exemplary embodiments of a user plane protocol stack of an UE performing sidelink communication.

FIG. 4 is a block diagram illustrating exemplary embodiments of a user plane protocol stack of an UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). In addition, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
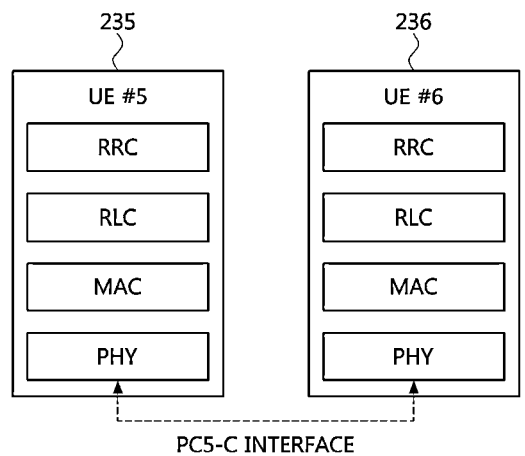
FIG. 5 is a block diagram illustrating a first exemplary embodiment of a control plane protocol stack of an UE performing sidelink communication.
Figure 6:
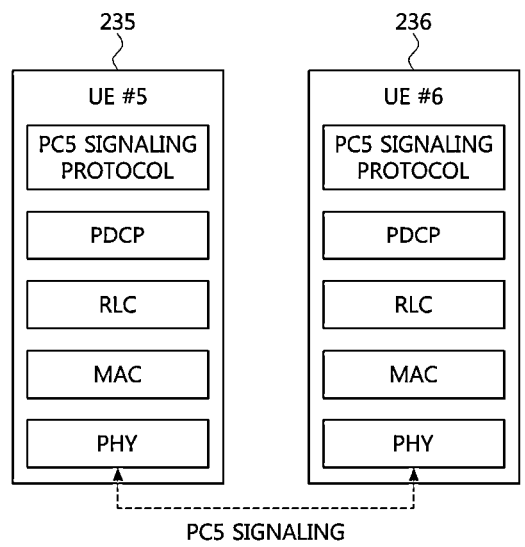
FIG. 6 is a block diagram illustrating a second exemplary embodiment of a control plane protocol stack of an UE performing sidelink communication.

FIG. 5 is a block diagram illustrating a first exemplary embodiment of a control plane protocol stack of an UE performing sidelink communication, and FIG. 6 is a block diagram illustrating a second embodiment of a control plane protocol stack of an UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Additionally, a demodulation reference signal (DM-RS), a synchronization signal, or the like may be used in the sidelink communications between the UEs 235 and 236.

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In particular, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In particular, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. Particularly, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In particular, the sidelink data may be transmitted and received through resources selected autonomously by the UE (e.g., UE 235 or 236) within the resource pool configured by the dedicated RRC signaling procedure or the broadcast RRC signaling procedure.

Next, methods for transmitting and receiving sidelink control information (SCI) including configuration information for transmission and reception in the communication system (e.g., cellular communication system) supporting the V2X communication as described above will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. In other words, when an operation of a first vehicle is described, a corresponding second vehicle may perform an operation corresponding to the operation of the first vehicle. Conversely, when an operation of the second vehicle is described, the corresponding first vehicle may perform an operation corresponding to the operation of the second vehicle. In the embodiments described below, the operation of the vehicle may be the operation of the communication node located in the vehicle.

The sidelink communication may be performed using a high frequency band (e.g., a millimeter wave band). In particular, the sidelink communication may be performed in a beam sweeping scheme. Accordingly, the transmitting terminal may transmit sidelink signals and/or channels in omni-direction by rotating a beam. The sidelink signal may be a synchronization signal (e.g., a synchronization signal/physical broadcast channel (SS/PBCH) block) and a reference signal used for the sidelink communication. For example, the reference signal may be a channel state information-reference signal (CSI-RS), a DM-RS, a phase tracking-reference signal (PT-RS), a cell specific reference signal (CRS), a sounding reference signal (SRS), a discovery reference signal (DRS), and the like. The sidelink channel may be a PSSCH, a PSCCH, a PSDCH, a PSBCH, a physical sidelink feedback channel (PSFCH), or the like. In addition, the sidelink channel may refer to a sidelink channel including a sidelink signal mapped to specific resources in the corresponding sidelink channel. The sidelink communication may support broadcast services, multicast services, groupcast services, and unicast services.

In the following exemplary embodiments, sidelink broadcast communication may refer to "sidelink communication performed in a broadcast manner", and sidelink multicast communication may refer to "sidelink communication performed in a multicast manner". Additionally, sidelink groupcast communication may refer to "sidelink communication performed in a groupcast manner", and sidelink unicast communication may refer to "sidelink communication performed in a unicast manner".

Figure 7:
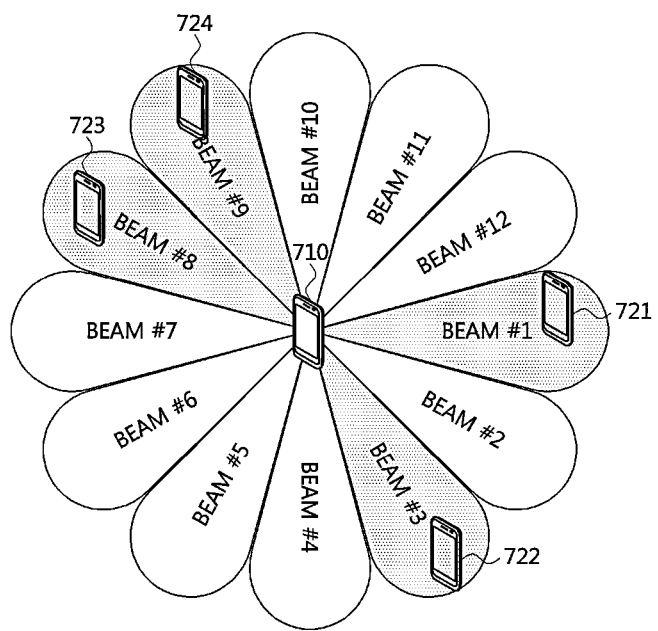
FIG. 7 is a conceptual diagram illustrating a first exemplary embodiment of a sidelink communication method performed in a beam sweeping scheme.
Figure 8:
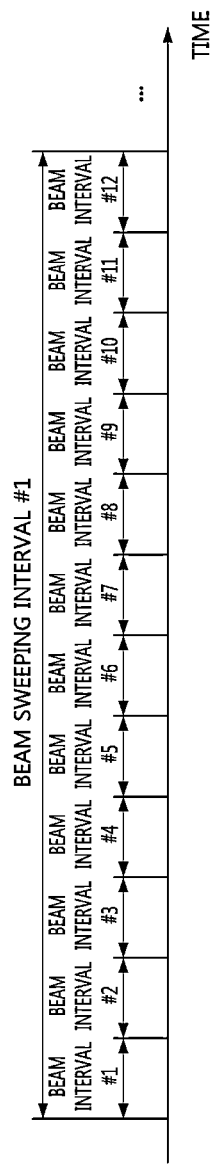
FIG. 8 is a timing diagram illustrating a first exemplary embodiment of a beam sweeping operation in a time domain.

FIG. 7 is a conceptual diagram illustrating a first exemplary embodiment of a sidelink communication method performed in a beam sweeping scheme, and FIG. 8 is a timing diagram illustrating a first exemplary embodiment of a beam sweeping operation in a time domain.

As shown in FIGS. 7 and 8, a transmitting terminal 710 may transmit sidelink signals and/or channels in a beam sweeping scheme. For example, the transmitting terminal 710 may transmit a sidelink signal and/or a sidelink channel using a beam #1 in a beam interval #1, and receive a sidelink signal and/or a sidelink channel from a receiving terminal (e.g., a receiving terminal #1 721) through the beam #1 in the beam interval #1. In addition, the transmitting terminal 710 may transmit a sidelink signal and/or a sidelink channel using a beam #2 in a beam interval #2, and receive a sidelink signal and/or a sidelink channel from the receiving terminal through the beam #2 in the beam interval #2.

For example, the transmitting terminal 710 may perform sidelink communication with the receiving terminal using beams defined in Table 3 below in the beam intervals #1 to #12. A beam sweeping interval including the beam intervals #1 to #12 may be periodically configured, and the transmitting terminal 710 may perform sidelink communication using the beams #1 to #12 within the beam sweeping interval.

TABLE 3

| Beam intervals | Used beam |
| --- | --- |
| Beam interval #1 | Beam #1 |
| Beam interval #2 | Beam #2 |
| Beam interval #3 | Beam #3 |
| Beam interval #4 | Beam #4 |
| Beam interval #5 | Beam #5 |
| Beam interval #6 | Beam #6 |
| Beam interval #7 | Beam #7 |
| Beam interval #8 | Beam #8 |
| Beam interval #9 | Beam #9 |
| Beam interval #10 | Beam #10 |
| Beam interval #11 | Beam #11 |
| Beam interval #12 | Beam #12 |

Meanwhile, the receiving terminals 721 to 724 may be located in specific areas. For example, the receiving terminal #1 721 may be located in an area associated with the beam #1 of the transmitting terminal 710, the receiving terminal #2 722 may be located in an area associated with the beam #3 of the transmitting terminal 710, the receiving terminal #3 723 may be located in an area associated with the beam #8 of the transmitting terminal 710, and the receiving terminal #4 724 may be located in an area associated with the beam #9 of the transmitting terminal 710. Even when the locations of the receiving terminals 721 to 724 are limited to the specific areas, the transmitting terminal 710 may transmit sidelink signals and/or channels in omni-direction using the beams #1 to #12. Accordingly, unnecessary sidelink signals and/or channels may be transmitted through the beams #2, #4 to #7, and #10 to #12. Such the transmission of unnecessary sidelink signals and/or channels may increase transmission delay, power consumption, and interference. To solve this problem, there is a need for methods for performing sidelink communication using beam(s) associated with the specific area(s) in which the receiving terminal(s) are located.

Figure 9:
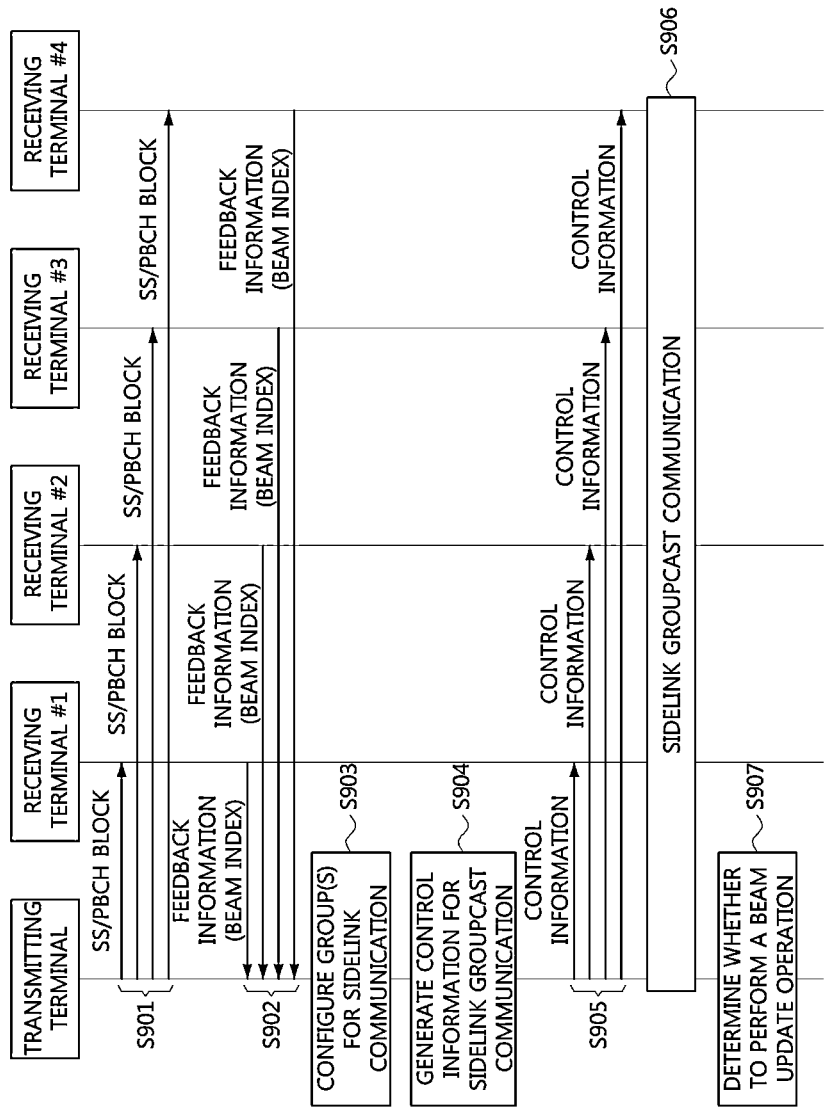
FIG. 9 is a sequence chart illustrating a first exemplary embodiment of a sidelink groupcast communication method.

FIG. 9 is a sequence chart illustrating a first exemplary embodiment of a sidelink groupcast communication method.

As shown in FIG. 9, a communication system may include a base station (not shown), a transmitting terminal, and receiving terminals #1 to #4. The base station may be the base station 210 shown in FIG. 2, the transmitting terminal may be the UE 235 shown in FIG. 2, and each of the receiving terminals #1 to #4 may be the UE 236 shown in FIG. 2. The receiving terminals #1 to #4 may be located within or outside the coverage of the base station. In addition, the transmitting terminal may be the transmitting terminal 710 shown in FIG. 7, and each of the receiving terminals #1 to #4 may be the receiving terminals #1 to #4 (i.e., 721 to 724) shown in FIG. 7. The transmitting terminal and the receiving terminal #1 to #4 may be configured identically or similarly to the communication node 300 shown in FIG. 3. The transmitting terminal and the receiving terminal #1 to #4 may support the protocol stacks shown in FIGS. 4 to 6.

The transmitting terminal and the receiving terminals #1 to #4 may participate in sidelink communication (e.g., sidelink groupcast communication). The transmitting terminal and the receiving terminals #1 to #4 may be connected to the base station, and may obtain configuration information for sidelink communication (e.g., configuration information for sidelink groupcast communication) in the access procedure (e.g., attach procedure) with the base station. The configuration information for sidelink communication may include one or more of information elements defined in Table 4 below. The configuration information for sidelink communication may be obtained through a combination of one or more of an RRC message, a MAC control element (CE), and downlink control information (DCI).

TABLE 4

| Information element | Description |
| --- | --- |
| SL-group BWP | BWP used for sidelink groupcast communication. Sidelink signal and/or channel can be transmitted within the SL-group BWP. |
| SL-group-RNTI | RNTI used for sidelink groupcast communication |
| Number of groups | The maximum number (e.g., 1, 2, 3, 4, or the like) of groups configurable in sidelink groupcast communication. One group may include one or more terminals. |
| Number of terminals | The maximum number of terminals (e.g., 1, 2, 3, 4, or the like) that can be included in the group configured for sidelink groupcast communication |
| Beam sweeping interval configuration information | Start point, length, and/or periodicity of a beam sweeping interval (e.g., beam sweeping interval of FIG. 8) in which the beam sweeping operation is performed |
| Beam interval configuration information | Number and/or lengths of beam intervals (e.g., beam intervals of FIG. 8) constituting the beam sweeping interval |
| Beam configuration information for beam sweeping operation | Number and/or width of beams used in the beam sweeping operation |
| Number of SS/PBCH block transmissions | Number of transmissions (e.g., maximum number of transmissions) of SS/PBCH block within one beam interval |
| Feedback configuration information | Resources (e.g., PSSCH, PSFCH) used for feeding back measurement information (e.g., CSI, CQI, RSRP, RSRQ, SNR, SINR, etc.) of signals and/or channels received from the transmitting terminal in the beam sweeping interval |

The transmitting terminal and the receiving terminals #1 to #4 may perform sidelink communication using the configuration information for sidelink communication (e.g., configuration information shown in Table 4) received from the base station.

The sidelink groupcast communication may be initiated by one of the terminals (e.g., the transmitting terminal). The transmitting terminal may transmit an SS/PBCH block (or PSDCH, reference signal) in a beam sweeping scheme (S901). The SS/PBCH block may be an SS/PBCH block configured for the sidelink groupcast communication. In the step S901, a sidelink signal for beam or channel measurement may be transmitted instead of the SS/PBCH block. For example, a synchronization signal (e.g., PSSS, SSSS) or a reference signal (e.g., CSI-RS, DRS (e.g., DRS consisting of PSSS and SSSS)) may be transmitted in the step S901.

In the step S901, the SS/PBCH block may be transmitted within an SL-group bandwidth part (BWP) configured by the base station. In addition, the SS/PBCH block may be transmitted based on the beam sweeping scheme described with reference to FIGS. 7 and 8. For example, the transmitting terminal may transmit the SS/PBCH block using the corresponding beam (e.g., one of the beams #1 to #12) in each of the beam intervals #1 to #12 within the beam sweeping interval. The number of repetitive transmissions of the SS/PBCH block within one beam interval may be configured by the base station. The SS/PBCH block may include one or more information elements among information elements defined in Table 5 below. One or more information elements (e.g., the information elements defined in Table 4) configured by the base station may be included in the SS/PBCH block transmitted from the transmitting terminal.

TABLE 5

| Information element | Description |
| --- | --- |
| SL-group-RNTI | RNTI used for sidelink groupcast communication |
| Number of groups | The maximum number (e.g., 1, 2, 3, 4, or the like) of groups configurable in sidelink groupcast communication. The group may include one or more terminals. |
| Number of terminals | The maximum number of terminals (e.g., 1, 2, 3, 4, or the like) that can be included in the group configured for sidelink groupcast communication |
| Beam sweeping interval configuration information | Start point, length, and/or periodicity of a beam sweeping interval (e.g., beam sweeping interval of FIG. 8) in which the beam sweeping operation is performed |
| Beam interval configuration information | Number and/or lengths of beam intervals (e.g., beam intervals of FIG. 8) constituting the beam sweeping interval |
| Beam configuration information for beam sweeping operation | Number and/or width of beams used in the beam sweeping operation |

TABLE 5-continued

| Information element | Description |
|---|---|
| Number of SS/PBCH block transmissions | Number of transmissions (e.g., maximum number of transmissions) of SS/PBCH block within one beam interval |
| Feedback configuration information | Resources (e.g., PSSCH, PSFCH) used for feeding back measurement information (e.g., CSI, CQI, RSRP, RSRQ, SNR, SINR, etc.) of signals and/or channels received from the transmitting terminal in the beam sweeping interval |
| CORESET configuration information | Configuration information of a CORESET associated with an SCI including control information for sidelink groupcast communication. The SCI may schedule a PSSCH including system information for sidelink groupcast communication. |
| Beam index | Index of a beam used for transmission of SS/PBCH block |
| Triggering information of beam update operation | Threshold #1: When the number of HARQ-NACKs exceeds threshold #1, the beam update operation is triggered.<br>Threshold #2: When a channel quality is less than threshold #2, the beam update operation is triggered.<br>Threshold #3: When the number of receiving terminals having a channel quality less than threshold #2 exceeds threshold #3, the beam update operation is triggered. |

The receiving terminals #1 to #4 may receive the SS/PBCH block (or PSDCH, reference signal) from the transmitting terminal by performing a monitoring operation within the beam sweeping interval (e.g., the beam sweeping interval within the SL-group BWP). The beam sweeping interval may be preconfigured by the base station through an RRC message, a MAC CE, and/or DCI. The receiving terminals #1 to #4 may be receiving terminals to participate in the sidelink groupcast communication. The receiving terminal not participating in the sidelink groupcast communication may not perform the monitoring operation in the beam sweeping interval within the SL-group BWP.

The receiving terminals #1 to #4 may identify information elements (e.g., information elements defined in Table 5) included in the SS/PBCH block. The receiving terminals #1 to #4 may identify a quality of a beam or a signal (e.g., SS/PBCH block, PDSCH, reference signal) by performing a beam measurement operation based on the signal and/or the channel received from the transmitting terminal. For example, the reception terminals #1 to #4 may perform the beam measurement operation, thereby identifying channel state information (CSI), channel quality indicator (CQI), reference signal received power (RSRP), reference signal received quality (RSRQ), signal to noise ratio (SNR), and/or signal to interference plus noise ratio (SINR).

The receiving terminals #1 to #4 may select a beam having the best quality among the beams #1 to #12 of the transmitting terminal based on the measured quality information. Referring to FIG. 7 again, since the receiving terminal #1 is located in an area corresponding to the beam #1 of the transmitting terminal, the beam #1 may have the best quality among the beams #1 to #12 measured at the receiving terminal #1. Accordingly, the receiving terminal #1 may select the beam #1 among the beams #1 to #12 of the transmitting terminal. Since the receiving terminal #2 is located in an area corresponding to the beam #3 of the transmitting terminal, the quality of the beam #3 may be the best among the beams #1 to #12 measured at the receiving terminal #2. Accordingly, the receiving terminal #2 may select the beam #3 among the beams #1 to #12 of the transmitting terminal.

Since the receiving terminal #3 is located in an area corresponding to the beam #8 of the transmitting terminal, the quality of the beam #8 may be the best among the beams #1 to #12 measured at the receiving terminal #3. Accordingly, the receiving terminal #3 may select the beam #8 among the beams #1 to #12 of the transmitting terminal. Since the receiving terminal #4 is located in an area corresponding to the beam #9 of the transmitting terminal, the quality of the beam #9 may be the best among the beams #1 to #12 measured at the receiving terminal #4. Accordingly, the receiving terminal #4 may select the beam #9 among the beams #1 to #12 of the transmitting terminal.

Each of the receiving terminals #1 to #4 may transmit feedback information including an index of the selected beam to the transmitting terminal (S902). The feedback information may further include beam quality information (e.g., CSI, CQI, RSRP, RSRQ, SNR, SINR, etc.), an identifier of the receiving terminal transmitting the feedback information, and the like. In the step S902, the feedback information may be transmitted to the transmitting terminal through resources (e.g., PSSCH, PSFCH) indicated by the feedback configuration information received from the base station. Alternatively, in the step S902, the feedback information may be transmitted to the transmitting terminal through resources (e.g., PSSCH, PSFCH) indicated by the feedback configuration information included in the SS/PBCH block received from the transmitting terminal.

Each of the receiving terminals #1 to #4 may inform the transmitting terminal of the corresponding beam index using the feedback resource (e.g., the resource indicated by the feedback configured information) within the beam interval, which is associated with the index of the selected beam. The receiving terminal #1 may transmit feedback information including information indicating the beam #1 to the transmitting terminal using the feedback resource in the beam interval #1 shown in FIG. 8 (e.g., the feedback resource indicated by the SS/PBCH block received in the beam interval #1), and the receiving terminal #2 may transmit feedback information including information indicating the beam #3 to the transmitting terminal using the feedback resource in the beam interval #3 shown in FIG. 8 (e.g., the feedback resource indicated by the SS/PBCH block received in the beam interval #3).

The receiving terminal #3 may transmit feedback information including information indicating the beam #8 to the transmitting terminal by using the feedback resource in the beam interval #8 shown in FIG. 8 (e.g., the feedback resource indicated by the SS/PBCH block received in the beam interval #8), and the receiving terminal #4 may transmit feedback information including information indicating the beam #9 to the transmitting terminal by using the feedback resource in the beam interval #9 shown in FIG. 8 (e.g., the feedback resource indicated by the SS/PBCH block received in the beam interval #9).

The transmitting terminal may receive the feedback information (e.g., beam index, quality information) from the receiving terminals (e.g., receiving terminals #1 to #4). The transmitting terminal may configure a group(s) for sidelink communication based on the feedback information (S903). For example, the transmitting terminal may determine that all receiving terminals which have transmitted the feedback information participate in the sidelink groupcast communication. In response to receiving of the feedback information from the receiving terminals #1 to #4, the transmitting terminal may determine that the receiving terminals #1 to #4 participate in the sidelink groupcast communication, and may configure the receiving terminals #1 to #4 participating in the sidelink groupcast communication into one or more groups. The number of groups configured in the step S903 may be equal to or less than the number indicated by "Number of groups" in Table 4 or Table 5, and the number of terminals included in one group configured in the step S903 may be equal to or less than the number indicated by the "Number of terminals" in Table 4 or Table 5.

For example, the transmitting terminal may configure the receiving terminals #1 to #4 into one group (hereinafter, referred to as "scenario #1"). Alternatively, the transmitting terminal may configure the receiving terminals #1 to #4 into a plurality of groups in consideration of the locations of the receiving terminals (hereinafter, referred to as "scenario #2"). In the scenario #2, the transmitting terminal may configure receiving terminals belonging to the same area into the same group. When sector areas corresponding to the beams of the transmitting terminal are defined as shown in Table 6 below, the transmitting terminal may configure the receiving terminals #1 and #2 belonging to the sector area #1 into a group #1, and configure the receiving terminals #3 and #4 belonging to the sector area #3 into a group #2.

TABLE 6

|  | Beams of transmitting terminal |
|---|---|
| Sector area #1 | Beams #1-3 |
| Sector area #2 | Beams #4-6 |
| Sector area #3 | Beams #7-9 |
| Sector area #4 | Beams #10-12 |

When the step S903 is completed, the transmitting terminal may generate control information for the sidelink groupcast communication (S904). In the scenario #1, the control information may include one or more information elements among information elements defined in Table 7 below.

TABLE 7

| Information element | Description |
|---|---|
| Number of groups | The number (e.g., 1) of groups configured for sidelink groupcast communication |
| Number of terminals | The number of terminals (e.g., 4) included in the group |
| Terminal identifiers | Identifiers of the terminals included in the group (e.g., identifiers of the receiving terminals #1 to #4) |
| Beam configuration information | Beam indexes for the terminals included in the group (e.g., beam #1 → receiving terminal #1, beam #3 → receiving terminal #2, beam #8 → receiving terminal #3, and beam #9 → receiving terminal #4) |
| Group transmission interval configuration information | Start point, length, bandwidth, and/or periodicity of group transmission interval, configuration information (start point, length, bandwidth) of a CORESET within the group transmission interval, and configuration information (start point, length, bandwidth) of a data channel within the group transmission interval |
| Triggering information of beam update operation | Threshold #1: When the number of HARQ-NACKs exceeds threshold #1, the beam update operation is triggered. Threshold #2: When a channel quality is less than threshold #2, the beam update operation is triggered. Threshold #3: When the number of receiving terminals having a channel quality less than threshold #2 exceeds threshold #3, the beam update operation is triggered. |

In the scenario #2, control information for the group #1 may include one or more information elements among information elements defined in Table 8 below, and control information for the group #2 may include one or more information elements among information elements defined in Table 9 below.

TABLE 8

| Information element | Description |
| --- | --- |
| Identifier of the group #1 | Information for identifying the group #1 among the groups configured for sidelink groupcast communication |
| Number of groups | The number (e.g., 2) of groups configured for sidelink groupcast communication |
| Number of terminals | The number of terminals (e.g., 2) included in the group #1 |
| Terminal identifiers | Identifiers of the terminals included in the group #1 (e.g., identifiers of the receiving terminals #1 to #2) |
| Beam configuration information | Beam indexes for the terminals included in the group #1 (e.g., beam #1 → receiving terminal #1, beam #3 → receiving terminal #2) |
| Group transmission interval configuration information for the group #1 | Start point, length, bandwidth, and/or periodicity of group transmission interval, configuration information (start point, length, bandwidth) of a CORESET within the group transmission interval, and configuration information (start point, length, bandwidth) of a data channel within the group transmission interval |
| Triggering information of beam update operation | Threshold #1: When the number of HARQ-NACKs exceeds threshold #1, the beam update operation is triggered.<br>Threshold #2: When a channel quality is less than threshold #2, the beam update operation is triggered.<br>Threshold #3: When the number of receiving terminals having a channel quality less than threshold #2 exceeds threshold #3, the beam update operation is triggered. |

TABLE 9

| Information element | Description |
| --- | --- |
| Identifier of the group #2 | Information for identifying the group #2 among the groups configured for sidelink groupcast communication |
| Number of groups | The number (e.g., 2) of groups configured for sidelink groupcast communication |
| Number of terminals | The number of terminals (e.g., 2) included in the group #2 |
| Terminal identifiers | Identifiers of the terminals included in the group #2 (e.g., identifiers of the receiving terminals #3 to #4) |
| Beam configuration information | Beam indexes for the terminals included in the group #2 (e.g., beam #8 → receiving terminal #3, beam #9 → receiving terminal #4) |
| Group transmission interval configuration information for the group #2 | Start point, length, bandwidth, and/or periodicity of group transmission interval, configuration information (start point, length, bandwidth) of a CORESET within the group transmission interval, and configuration information (start point, length, bandwidth) of a data channel within the group transmission interval |
| Triggering information of beam update operation | Threshold #1: When the number of HARQ-NACKs exceeds threshold #1, the beam update operation is triggered.<br>Threshold #2: When a channel quality is less than threshold #2, the beam update operation is triggered.<br>Threshold #3: When the number of receiving terminals having a channel quality less than threshold #2 exceeds threshold #3, the beam update operation is triggered. |

In the scenario #1, the group transmission interval may be configured as follows.

Figure 10:
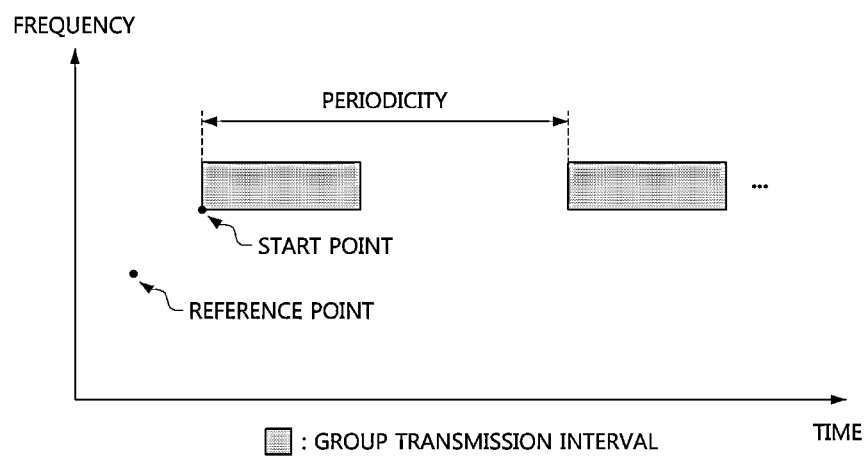
FIG. 10 is a timing diagram illustrating a first exemplary embodiment of a group transmission interval.

FIG. 10 is a timing diagram illustrating a first exemplary embodiment of a group transmission interval.

As shown in FIG. 10, sidelink groupcast communication may be performed between the transmitting terminal and the receiving terminals #1 to #4 within the group transmission interval. The group transmission interval may include a control resource set (CORESET) and a data channel (e.g., PSSCH). The group transmission interval may include a sub transmission interval #1 for the receiving terminal #1, a sub transmission interval #2 for the receiving terminal #2, a sub transmission interval #3 for the receiving terminal #3, and a sub transmission interval for the receiving terminal #4. The sub transmission intervals of the respective receiving terminals may be distinguished in the time and/or frequency domain. In each of the sub transmission intervals, a CORESET (e.g., a control channel) and a data channel may be configured. Alternatively, the sub transmission intervals of the respective receiving terminals may not be configured within the group transmission interval.

The group transmission interval may be configured within the SL-group BWP and may be repeated according to a preconfigured periodicity. The start point of the group transmission interval may be indicated by an offset from a preconfigured reference point. The reference point in the frequency domain may be a resource block (RB) #0 (e.g., subcarrier #0 of a common resource block (CRB) #0) of the SL-group BWP or an initial BWP. The reference point in the time domain may be the start time of the slot #0 or the subframe #0.

The periodicity of the group transmission interval may be one or more slots, subframes, or radio frames. The length of the group transmission interval may be configured in units of slots or subframes. The bandwidth of the group transmission interval may be configured in units of RB or CRB and may be equal to or less than the bandwidth of the SL-group BWP.

In the scenario #2, the group transmission intervals #1 and #2 may be configured as follows.

Figure 11:
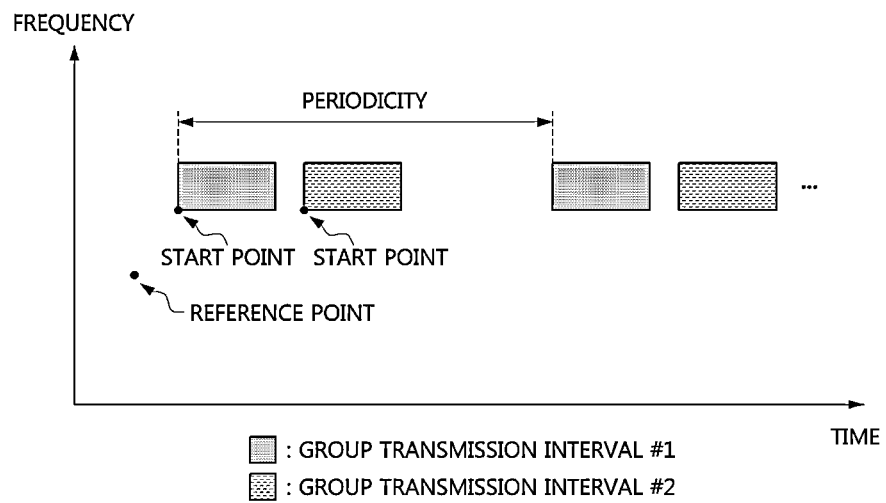
FIG. 11 is a timing diagram illustrating a second exemplary embodiment of a group transmission interval.

FIG. 11 is a timing diagram illustrating a second exemplary embodiment of a group transmission interval.

As shown in FIG. 11, sidelink groupcast communication may be performed between the transmitting terminal and the receiving terminals #1 to #2 belonging to the group #1 within the group transmission interval #1, and sidelink groupcast communication may be performed between the transmitting terminal and the receiving terminals #3 to #4 belonging to the group #2 within the group transmission interval #2. Each of the group transmission intervals #1 and #2 may include a CORESET (e.g., PSCCH) and a data channel (e.g., PSSCH). The group transmission interval #1 may include a sub transmission interval #1 for the receiving terminal #1 and a sub transmission interval #2 for the receiving terminal #2. The group transmission interval #2 may include a sub transmission interval #1 for the receiving terminal #3 and a sub transmission interval #2 for the receiving terminal #4. The sub transmission intervals of the respective receiving terminals may be distinguished in the time and/or frequency domain. A CORESET and a data channel may be configured in each of the sub transmission intervals. Alternatively, the sub transmission intervals of the respective receiving terminals may not be configured within the group transmission intervals #1 and #2.

The group transmission intervals #1 and #2 may be configured within the SL-group BWP and may be repeated according to a preconfigured periodicity. The group transmission intervals #1 and #2 may be configured continuously or discontinuously. The start points of the group transmission intervals #1 and #2 may be indicated by offsets from a preconfigured reference point. The reference point in the frequency domain may be a subcarrier #0 of a RB #0 (e.g., CRB #0) of the SL-group BWP or the initial BWP. The reference point in the time domain may be the start time of a slot #0 or a subframe #0.

The periodicity of the group transmission intervals #1 and #2 may be one or more slots, subframes, or radio frames. The lengths of the group transmission intervals 1 and #2 may be set in units of slots or subframes. The bandwidths of the group transmission intervals #1 and #2 may be configured in units of RB or CRB and may be less than or equal to the bandwidth of the SL-group BWP.

Referring back to FIG. 9, the transmitting terminal may transmit the control information set in step S904 to the receiving terminals #1 to #4 (S905). The control information may be transmitted to the receiving terminals #1 to #4 through a combination of one or more of an RRC message, MAC CE, and SCI. The control information may be transmitted through the beam period defined in Table 3 and FIG. 8. For example, the transmitting terminal may transmit the control information to the receiving terminal #1 in the beam interval #1, transmit the control information to the receiving terminal #2 in the beam interval #3, transmit the control information to the receiving terminal #3 in the beam interval #8, and transmit the control information to the receiving terminal 4 in the beam interval #9. Alternatively, the control information may be transmitted through the group transmission interval shown in FIGS. 10 and 11.

The receiving terminals #1 to #4 may receive control information from the transmitting terminal, and may identify the information elements included in the control information. For example, the receiving terminals #1 to #4 may identify the group transmission interval. When the step S905 is completed, sidelink groupcast communication may be performed within the group transmission interval (S906).

In the scenario #1, the transmitting terminal may transmit an SCI including scheduling information to one or more receiving terminals among the receiving terminals #1 to #4 in the group transmission interval shown in FIG. 10. The SCI may indicate a PSSCH resource within the group transmission interval. In addition, the SCI may further include triggering information of a beam update operation. Particularly, a cyclic redundancy check (CRC) of the SCI may be scrambled with the SL-group-RNTI. Each of the receiving terminals #1 to #4 may perform a monitoring operation using the SL-group RNTI to detect the SCI in the group transmission interval (e.g., the CORESET of the group transmission interval). When the SCI is detected in the group transmission interval, each of the receiving terminals #1 to #4 may transmit sidelink data to the transmitting terminal using the PSSCH indicated by the SCI.

Alternatively, each of the receiving terminals #1 to #4 may receive the sidelink data from the transmitting terminal through the PSSCH indicated by the SCI. Each of the receiving terminals #1 to #4 may transmit a HARQ response (e.g., an acknowledgment (ACK) or a negative ACK (NACK)) on the sidelink data to the transmitting terminal. The HARQ response may be transmitted within the group transmission interval.

In addition, the transmitting terminal may transmit a reference signal to each of the receiving terminals #1 to #4 within the group transmission interval. Each of the reception terminals #1 to #4 may measure channel quality (e.g., beam quality) based on the reference signal received within the group transmission interval, and transmit the measured quality information (e.g., CSI, CQI, RSRP, RSRQ, SNR, SINR, etc.) to the transmitting terminal.

In the scenario #2, the transmitting terminal may transmit SCI #1 including scheduling information to the receiving terminals #1 and/or #2 in the group transmission interval #1 shown in FIG. 11. The SCI #1 may indicate a PSSCH resource within the group transmission interval #1. In addition, the SCI #1 may further include triggering information of a beam update operation. Particularly, a CRC of the SCI #1 may be scrambled with the SL-group-RNTI. Each of the receiving terminals #1 and #2 may perform a monitoring operation using the SL-group RNTI to detect the SCI #1 in the group transmission interval #1 (e.g., CORESET of the group transmission interval #1). When the SCI #1 is detected in the group transmission interval #1, each of the receiving terminals #1 and #2 may transmit sidelink data to the transmitting terminal using the PSSCH indicated by the SCI #1.

Alternatively, each of the receiving terminals #1 and #2 may receive sidelink data from the transmitting terminal through the PSSCH indicated by the SCI #1. Each of the receiving terminals #1 and #2 may transmit a HARQ response (e.g., ACK or NACK) for the sidelink data to the transmitting terminal. The HARQ response may be transmitted within the group transmission interval #1.

In addition, the transmitting terminal may transmit a reference signal to each of the receiving terminals #1 and #2 within the group transmission interval #1. Each of the receiving terminals #1 and #2 may measure a channel quality (e.g., beam quality) based on the reference signal received within the group transmission interval #1, and transmit the measured quality information (e.g., CSI, CQI, RSRP, RSRQ, SNR, SINR, etc.) to the transmitting terminal.

In the scenario #2, the transmitting terminal may transmit SCI #2 including scheduling information to the receiving terminals #3 and/or #4 in the group transmission interval #1 shown in FIG. 11. The SCI #2 may indicate a PSSCH resource within the group transmission interval #2. In addition, the SCI #2 may further include triggering information of a beam update operation. Particularly, a CRC of the SCI #2 may be scrambled with the SL-group-RNTI. Each of the receiving terminals #3 and #4 may perform a monitoring operation using the SL-group RNTI to detect the SCI #2 in the group transmission interval #2 (e.g., CORESET of the group transmission interval #2). When the SCI #2 is detected in the group transmission interval #2, each of the receiving terminals #3 and #4 may transmit sidelink data to the transmitting terminal using the PSSCH indicated by the SCI #2.

Alternatively, each of the receiving terminals #3 and #4 may receive sidelink data from the transmitting terminal through the PSSCH indicated by the SCI #2. Each of the receiving terminals #3 and #4 may transmit a HARQ response (e.g., ACK or NACK) for the sidelink data to the transmitting terminal. The HARQ response may be transmitted within the group transmission interval #2.

In addition, the transmitting terminal may transmit a reference signal to each of the receiving terminals #3 and #4 within the group transmission interval #2. Each of the receiving terminals #3 and #4 may measure a channel quality (e.g., beam quality) based on the reference signal received within the group transmission interval #2, and transmit the measured quality information (e.g., CSI, CQI, RSRP, RSRQ, SNR, SINR, etc.) to the transmitting terminal.

Meanwhile, the transmitting terminal may determine whether to perform a beam update operation based on the feedback information (e.g., HARQ response and quality information) received from the receiving terminals #1 to #4 (S907). For example, the transmitting terminal may determine that the beam update operation is necessary when one or more of the following conditions are satisfied.

Condition 1: The number of HARQ-NACKs>Threshold #1
Condition 2: Channel quality (e.g., CQI)<Threshold #2
Condition 3: The number of receiving terminals having a channel quality (e.g., CQI) less than Threshold #2>Threshold #3

In response to determining that the beam update operation is necessary, the transmitting terminal may start again from the step S901. In particular, the group configured in the step S903 may be initialized, and the group transmission interval configured in the step S904 may be initialized. Accordingly, the transmitting terminal may perform the step S901 again after transmitting a message indicating that the sidelink groupcast communication has ended.

Alternatively, triggering of the beam update operation may be performed by the receiving terminals #1 to #4. For example, each of the receiving terminals #1 to #4 may transmit a message requesting the triggering of the beam update operation to the transmitting terminal when the conditions 1 and/or 2 are satisfied. If the message requesting the triggering of the beam update operation is received from one or more receiving terminals among the receiving terminals #1 to #4 participating in the sidelink groupcast communication, the transmitting terminal may start again from the step S901.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a first user equipment (UE), the method comprising:
   receiving information of a number of synchronization signal/physical broadcast channel (SS/PBCH) block transmissions for sidelink communication from a base station;
   transmitting one or more SS/PBCH blocks based on the information in a sidelink; and
   transmitting a reference signal for sidelink measurement in the sidelink;
   wherein a number of the one or more SS/PBCH blocks is equal to or less than the number of SS/PBCH block transmissions.

2. The method of claim 1, wherein the number of SS/PBCH block transmissions is a maximum number of SS/PBCH block transmissions performed by the first UE in an interval.

3. The method of claim 1, wherein the one or more SS/PBCH blocks is transmitted based on a beam sweeping scheme, and the one or more SS/PBCH blocks is used for the sidelink measurement.

4. The method of claim 1, wherein each of the one or more SS/PBCH blocks include feedback configuration information, and feedback information of one or more UEs is received in a resource indicated by the feedback configuration information.

5. The method of claim 1, further comprising:
   receiving first feedback information including a measurement result of the reference signal from one or more UEs;
   generating control information for sidelink groupcast communication, and the control information including an identifier of a second UE of the one or more UEs;

transmitting the control information to the second UE; and performing the sidelink groupcast communication by transmitting a sidelink channel based on the control information.

6. The method of claim 5, wherein the reference signal is transmitted within a beam sweeping interval configured by the base station, and the beam sweeping interval is configured within a bandwidth part (BWP) for the sidelink communication.

7. The method of claim 5, wherein the measurement result includes a beam index of the first UE selected based on a beam quality measured based on the reference signal.

8. The method of claim 5, wherein a transmission interval is configured based on the first feedback information, and the sidelink channel is transmitted to the one or more UEs in a beam sweeping scheme within the transmission interval.

9. The method of claim 5, further comprising:
receiving second feedback information for the sidelink channel from the one or more UEs; and
determining whether to perform ad beam update operation based on the second feedback information,
wherein the second feedback information includes at least one of a hybrid automatic repeat request (HARQ) response or quality information for the sidelink channel.

10. The method of claim 5, wherein the sidelink channel includes a physical sidelink control channel (PSCCH) and a physical sidelink shared channel (PSSCH), and the PSCCH includes scheduling information of the PSSCH and triggering information for a beam update operation.

11. A method of a second user equipment (UE), the method comprising:
receiving information of a number of synchronization signal/physical broadcast channel (SS/PBCH) block transmissions for sidelink communication from a base station;
performing a monitoring operation of one or more SS/PBCH blocks based on the information in a sidelink; and
receiving a reference signal for sidelink measurement from a first UE in the sidelink;
wherein a number of the one or more SS/PBCH blocks is equal to or less than the number of SS/PBCH block transmissions.

12. The method of claim 11, wherein the number of SS/PBCH block transmissions is a maximum number of SS/PBCH block transmissions to be transmitted in an interval.

13. The method of claim 11, wherein the one or more SS/PBCH blocks is transmitted based on a beam sweeping scheme, and the one or more SS/PBCH blocks is used for the sidelink measurement.

14. The method of claim 11, wherein each of the one or more SS/PBCH blocks include feedback configuration information, and feedback information of the second UE is transmitted in a resource indicated by the feedback configuration information.

15. The method of claim 11, further comprising:
transmitting first feedback information including a measurement result of the reference signal to the first UE;
receiving control information for sidelink groupcast communication from the first UE, and the control information including an identifier of the second UE; and
receiving a sidelink channel based on the control information for the sidelink groupcast communication from the first UE.

16. The method of claim 15, wherein the reference signal is received within a beam sweeping interval configured by the base station, and the beam sweeping interval is configured within a bandwidth part (BWP) for the sidelink communication.

17. The method of claim 15, wherein the measurement result includes a beam index of the first UE selected based on a beam quality measured based on the reference signal.

18. The method of claim 15, wherein a transmission interval is configured based on the first feedback information, and the sidelink channel is transmitted in a beam sweeping scheme within the transmission interval.

19. The method of claim 15, further comprising:
transmitting second feedback information for the sidelink channel to the first UE,
wherein the second feedback information includes at least one of a hybrid automatic repeat request (HARQ) response or quality information for the sidelink channel, and the first UE determines whether to perform a beam update operation based on the second feedback information.

20. The method of claim 15, wherein the sidelink channel includes a physical sidelink control channel (PSCCH) and a physical sidelink shared channel (PSSCH), and the PSCCH includes scheduling information of the PSSCH and triggering information for a beam update operation.

* * * * *